United States Patent [19]

Naples

[11] 4,381,388

[45] Apr. 26, 1983

[54] STORAGE STABLE ONE COMPONENT URETHANES AND METHOD FOR USING SAME

[75] Inventor: Gerald Naples, Hamburg, N.Y.

[73] Assignee: Textron Inc., Providence, R.I.

[21] Appl. No.: 323,719

[22] Filed: Nov. 23, 1981

[51] Int. Cl.³ .............................................. C08G 18/10
[52] U.S. Cl. ........................................................ 528/59
[58] Field of Search ............................................ 528/59

[56] References Cited

U.S. PATENT DOCUMENTS

| | | | |
|---|---|---|---|
| 3,743,626 | 7/1973 | Emmons | 528/73 |
| 4,024,117 | 5/1977 | Emmons | 528/73 |
| 4,032,686 | 6/1977 | Emmons | 528/73 |

OTHER PUBLICATIONS

Saunders et al., Polyurethanes, Part II, Interscience, NY, 1964, p. 11.

*Primary Examiner*—Maurice J. Welsh
*Attorney, Agent, or Firm*—Michael L. Dunn

[57] ABSTRACT

A storage stable, weather resistant, one-component air cured urethane composition. The composition comprises a moisture activated curing agent and a polyisocyanate prepolymer. The moisture activated curing agent comprising an oxazolidine ring. The polyisocyanate prepolymer comprises at least two unreacted isocyanate groups and is the reaction product of a polyester polyol, a low molecular weight polyol having at least three hydroxy groups and isophorone diisocyanate. The polyester polyol and low molecular weight polyol are reacted with the isocyanate at an equivalent weight ratio of polyester polyol to low molecular weight polyol of from 0.25:1 to 5:1.

The invention also comprises the method for coating a surface with the composition and the resulting coated article.

26 Claims, No Drawings

STORAGE STABLE ONE COMPONENT URETHANES AND METHOD FOR USING SAME

BACKGROUND OF THE INVENTION

1. Field of the Invention

This invention relates to polyurethane coating compositions and more particularly relates to one-component storage stable polyurethane compositions.

2. History of the Prior Art

In the prior art, it has been known that polyurethanes can be formed by the reaction of isocyanates with active hydrogen compounds such as polyols (polyfunctional alcohols). Since isocyanates and active hydrogen compounds usually react very quickly even at room temperature, the two components to form the polyurethane compositions usually must be stored separately and mixed together only at the time when the coating is to be used.

Several approaches have been investigated to provide a one-component composition in which the reacting materials are combined before using and then later activated. For example, prepolymer isocyanates have been converted into derivatives of isocyanates which regenerate the isocyanate only upon heating. This heating process has several disadvantages especially when the polyurethane is to be used as a coating. It is, for example, very difficult to heat a very large surface or to heat a surface which is temperature sensitive.

Another technique for the manufacture of one-component polyurethane systems is the formation of moisture cure systems. This process involves the formation of an isocyanate prepolymer which reacts with moisture from the atmosphere to form a polymeric coating. Although this type of system has met with large success, it nevertheless suffers from certain disadvantages. For example, heavy coatings are difficult to make because of the requirement to release carbon dioxide formed by the reaction of the isocyanate with water. Furthermore, since the chain extender is water, polymer characteristics are not as good as when polyols or polyamines are used as the chain extenders in the two part urethane coating compositions. It is therefore desirable to provide polymer forming compositions which are only one-component in nature, which are stable on storage and which can be cured in the absence of any excessive heating and without the specific addition of other materials.

It is disclosed in U.S. Pat. Nos. 3,743,626; 4,024,117 and 4,032,686 that certain oxazolidine compositions and polyfunctional aliphatic or aromatic isocyanates can be cured in the presence of moisture to give polymeric materials which are suitable for coatings. It is further disclosed that some such compositions can be stored in the absence of moisture without significant reaction between the oxazolidine and the isocyanate. Unfortunately such compositions, as disclosed in the foregoing U.S. patents have serious disadvantages. In particular, such coatings are not high performance coatings, i.e., they do not have the hardness, strength, or weather resistance suitable for high performance applications such as those encountered in exterior environments.

BRIEF DESCRIPTION OF THE INVENTION

In accordance with the invention, there is provided a storage stable, weather resistant, one-component air curable urethane composition which comprises a moisture activated curing agent and a polyisocyanate prepolymer. The moisture activated curing agent comprises an oxazolidine ring. The polyisocyanate prepolymer comprises at least two unreacted isocyanate groups and the prepolymer is a reaction product of a polyester polyol, a low molecular weight polyol having at least three hydroxy groups and isophorone diisocyanate. The polyester polyol is present at an equivalent weight ratio to low molecular weight polyol of from 0.25:1 to 5:1.

The invention also comprises a method for coating a surface by applying the composition of the invention to the surface and exposing the applied composition to air having a relative humidity of at least 10% and includes an article coated with the cured composition.

DETAILED DESCRIPTION OF THE INVENTION

The moisture activated curing agent which comprises an oxazolidine ring is usually a compound of the formula:

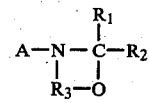

wherein $R_1$ and $R_2$ are independently at each occurrence hydrogen, lower alkyl, substituted lower alkyl of 1 to 12 carbon atoms, phenyl or substituted phenyl. $R_3$ is a substituted or unsubstituted alkylene group of two or three carbon atoms excluding substituents. A is a substituted or unsubstituted alkyl or alkenyl group which usually has less than 20 carbon atoms per oxazolidine ring in the curing agent. Suitable substituents in the $R_1$, $R_2$, $R_3$ and A groups are substituents such as halogen, alkyl, isocyanate, and ester groups which do not contain an active hydrogen atom. i.e., a hydrogen atom which will react with an isocyanate group. Substituents which are unsuitable therefore include aliphatic or aromatic hydroxy groups, acid groups and primary or secondary amine groups.

A particularly desirable oxazolidine compound is represented by the formula:

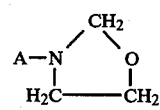

wherein A is an acrylic moiety. Such a compound is commercially available from Rohm and Haas Corporation under the trademark Acryloid AU-568 which is provided as an 85% non-volatiles solution in 2-ethoxyethyl acetate and has an equivalent weight of about 265 (solids basis). A detailed discussion of oxazolidine compounds which may be suitable for use in accordance with the present invention is found in U.S. Pat. No. 3,743,626.

The quantity of oxazolidine curing agent is the amount necessary to cause connecting and usually crosslinking of the prepolymer molecules. The oxazolidine curing agent is therefore present in the composition of the invention at an equivalent weight ratio to prepolymer of from 0.4:1 to 2:1, usually 0.8:1 to 1.2:1 and preferably about 1:1. The equivalent weight of the curing agent is determined by dividing the molecular weight of the curing agent by the number of groups in the curing agent which are able to react with an isocyanate group in the prepolymer after the curing agent in the composition is exposed to moisture to break the oxazolidine ring.

The prepolymer used in accordance with the present invention is a prepolymer formed from a polyester polyol, a low molecular weight polyol and isophorone diisocyanate. The prepolymer is prepared by reaction of the polyols with an excess of isocyanate to yield an isocyanate terminated prepolymer. Usually the equivalent weight ratio of isophorone diisocyanate to combined polyester polyol and low molecular weight polyol is from 1.4:1 to 2.5:1. Most desirably the ratio is about 2:1. Suitable reaction temperatures are usually between about 75° and 150° C. and the reaction time is usually between about 1 hour and 8 hours. Desirably, a catalyst such as dibutyl tin dilaurate or the like is present in the reaction mixture for preparing the prepolymer.

The polyester polyol can have a hydroxy functionality of between 2 and 3 and may be prepared by methods known in the art including the opening and subsequent polymerization of lactone ring such as caprolactone, butyrolactone or valerolactone or by reacting a dibasic acid with a diol. The polymerizations to form the polyester polyols are usually conducted in the presence of a trifunctional alcohol to increase the hydroxy functionality. The polyester polyol usually has a molecular weight of between about 300 and about 2000 and preferably from about 450 to about 1500. Polycaprolactone esters have been reported to impart improved weather resistance and hydrolytic stability to polyurethanes containing such polyesters.

In addition to the polyester polyol and the isophorone diisocyanate, the reaction mixture to prepare the prepolymer must contain a low molecular weight polyol, i.e., a polyol having a molecular weight below 500 and preferably below 400. The low molecular weight polyol is usually a triol such as glycerine, trimethylolethane, trimethylolpropane, hexanetriol or tris(2-hydroxyethyl) isocyanurate. The low molecular weight polyol could, however, be a tetrol such as pentaerythritol. The most preferred polyol is tris(2-hydroxyethyl) isocyanurate. The low molecular weight polyol is present in the prepolymer reaction mixture at an equivalent weight ratio (based upon a comparison of hydroxy groups) of polyester polyol to low molecular weight polyol of from 0.25:1 to 5:1 and preferably 0.5:1 to 3:1.

The reaction mixture to prepare the prepolymer for use in the storage stable, weather resistant, air cured composition must also contain isophorone diisocyanate. Sufficient diisocyanate is used to react with essentially all of the hydroxy groups of the polyester polyol and the low molecular weight polyol to form a prepolymer terminated with isocyanate groups. The equivalent weight ratio of isophorone diisocyanate to combined polyester polyol and low molecular weight polyol is from 1.4:1 to 2.5:1 and is preferably about 2:1.

The isophorone diisocyanate used in the reaction to form the prepolymer of the composition is a diisocyanate well known in the art and is also known as 3-isocyanatomethyl-3',5,5-trimethyl cyclohexylisocyanate and is often abreviated as IPDI.

When the composition is coated upon a surface, atmospheric moisture initiates polymerization of the composition to form a urethane coating. A trace amount of moisture is usually all that is necessary to initiate the reaction and cure the composition.

The relative humidity of the atmosphere to which the composition is exposed is, however, desirably at least 10% and preferably 40% or higher.

It is believed that the polymeric urethane formed from the composition of the invention results from the rapid hydrolysis of the oxazolidine which opens the ring at one of the bonds to the oxygen atom of the ring, e.g.:

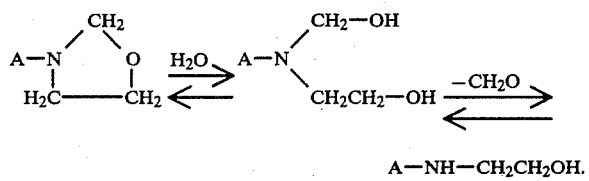

$$A-NH-CH_2CH_2OH.$$

The resulting amino alcohol produced contains active hydrogens on the amine and hydroxy groups which rapidly react with the isocyanate prepolymer to form a cured polyurethane-urea composition having strength, hardness and weather resistance better than prior art one-component air cured urethane compositions. In addition, the composition before being exposed to moisture is exceedingly storage stable.

The composition of the invention can be used in a variety of high performance applications to form articles having weather resistant top coats for substrates such as metal, plastic and wood and as adhesives and tie coats for both natural and synthetic materials such as paper, textiles, glass, wood, plastics, metal or leather.

The composition of the invention is storage stable, i.e., the one part composition can be stored for months without a significant increase in viscosity and is weather resistant, i.e., can be exposed to sunlight and water for months without a significant change in strength or surface appearance.

The following examples serve to illustrate and not limit the present invention.

EXAMPLE 1

Preparation of Caprolactone/triol/IPDI Prepolymers

Summarized below is a description for the preparation of an aliphatic type prepolymer. Although this process describes the reaction between a caprolactone polyol and isophorone diisocyanate, the method can be used with other polyester polyols.

Into a flask equipped with an agitator, a Dean-Stark water removal trap, a thermometer and reflux condenser were charged 181.85 grams (1.0 eq) of Union Carbide Niax Polycaprolactone PCP-0300, 87.9 grams (1 equivalent) of trishydroxyethylisocyanurate (THEIC), 240.4 grams of Cellosolve acetate and 240.4 grams of xylene. The solution was heated to reflux while removing the water by azeotropic distillation. After all the water was removed, the solution was cooled to 40° C. and then 453.2 grams (4.1 eq) of isophorone diisocyanate and 0.18 grams of dibutyltin dilaurate were added all at once. After the exothermic reaction had subsided, the mixture was heated at 90°–100° C. for three hours or until the theoretical NCO was obtained. The results are shown in Table 1.

EXAMPLE 2

The procedure of Example 1. is followed except that 45 grams (1 gram equivalent) of trimethylol propane (TMP) is substituted for THEIC and the weight percent of solvent is adjusted accordingly. The results are shown in Table 1.

EXAMPLE 3

The procedure of Example 1 is followed except that 1 gram equivalent of Union Carbide Niax PCP-310 polyester polyol is used instead of the PCP-300. The results are shown in Table 1.

EXAMPLE 4

The procedure of Example 2 is followed except that 1 gram equivalent of Union Carbide Niax PCP-310 polyester polyol is used instead of the PCP-300. The results are shown in Table 1.

EXAMPLE 5

The procedure of Example 2 is followed except that 1 gram equivalent of Union Carbide Niax PCP-301 polyester polyol is used instead of the PCP-300. The results are shown in Table 1.

EXAMPLE 6

The procedure of Example 1 is followed except that THEIC is absent as in prior art and 2 gram equivalents of Union Carbide Niax Polycaprolactone PCP-300 are used. The results are shown in Table 1.

EXAMPLE 7

The procedure of Example 3 is followed except that THEIC is absent as in prior art and 2 gram equivalents of Union Carbide Niax Polycaprolactone PCP-310 are used. The results are shown in Table 1.

EXAMPLE 8

The procedure of Example 5 is followed except that TMP is absent as in prior art and 2 gram equivalents of Union Carbide Niax Polycaprolactone PCP-301 are used. The results are shown in Table 1.

TABLE 1

ISOPHORONE DIISOCYANATE - TRIOL BASED PREPOLYMERS

| Example | Poly Triol | Triol | Polyol/Triol | NCO/OH | NV, % | NCO, % | Visc, sec |
|---|---|---|---|---|---|---|---|
| 1. | Niax PCP-0300 | THEIC | 1/1 | 2.0 | 60.2 | 6.85 | 8.1 |
| 2. | Niax PCP-0300 | TMP | 1/1 | 2.0 | 50.8 | 5.96 | 0.7 |
| 3. | Niax PCP-0310 | THEIC | 1/1 | 2.0 | 60.0 | 5.10 | 5.1 |
| 4. | Niax PCP-0310 | TMP | 1/1 | 2.0 | 50.0 | 5.17 | 0.5 |
| 5. | Niax PCP-0301 | TMP | 3/1 | 2.0 | 50.5 | 6.68 | 0.5 |
| 6. | Niax PCP-0300 | — | — | 2.0 | 50.3 | 5.19 | 0.5 |
| 7. | Niax PCP-0310 | — | — | 2.0 | 50.1 | 3.86 | 0.3 |
| 8. | Niax PCP-0301 | — | — | 2.0 | 50.2 | 6.18 | 0.5 |

Niax PCP-0300 - Mol Wt 540 - Hydroxy No. 310
Niax PCP-0310 - Mol Wt 900 - Hydroxy No. 187
Niax PCP-0301 - Mol Wt 300 - Hydroxy No. 560
TMP = Trimethylolpropane - Mol Wt 135
THEIC = Trishydroxyethyl isocyanurate - Mol Wt 261
NV = Nonvolatiles

EXAMPLE 9

Prepolymer-Oxazolidine Combinations

The prepolymers described in Table 1 were all combined with Rohm and Haas Acryloid AU-568 acrylic oxazolidine at a stoichiometric ratio of 1:1 by equivalents. Summarized in Table 2 are the physical characteristics of the polymer combinations.

TABLE 2

CAPROLACTONE/IPDI PREPOLYMERS AND ACRYLOID AU-568

| No. | Prepolymer | Solvents | NV, % | NCO, % | Visc, sec |
|---|---|---|---|---|---|
| 1. | PCP-0300/THEIC/IPDI/AU-568 | CX | 60.1 | 3.3 | 4.0 |
| 2. | PCP-0300/TMP/IPDI/AU-568 | CX | 60.5 | 2.20 | 0.85 |
| 3. | PCP-0310/THEIC/IPDI/AU-568 | CX | 60.1 | 2.68 | 4.2 |
| 4. | PCP-0310/TMP/IPDI/AU-568 | CX | 60.4 | 2.52 | 1.0 |
| 5. | PCP-0301/TMP/IPDI/AU-568 | CX | 50.4 | 2.22 | 0.85 |
| 6. | PCP-0300/IPDI/AU-568 | CX | 50.3 | 2.04 | 0.5 |
| 7. | PCP-0310/IPDI/AU-568 | CX | 66.3 | 2.54 | 4.0 |
| 8. | PCP-0301/IPDI/AU-568 | CX | 50.1 | 1.9 | 0.65 |

CX = cellulose acetate in xylene 50:50 wt ratio

EXAMPLE 10

Coating Performance Characteristics

The oxazolidine modified prepolymers described in Table 2 were all screened and evaluated by converting them into coatings. In every case, the materials were either cast into films or sprayed onto metal substrates and allowed to dry at 70° F. and 50% relative humidity.

Testing of the products was carried out only after aging at ambient conditions for a period of 10-14 days. The results obtained are summarized in Table 3.

The data indicates that hard coatings are readily prepared from the Niax PCP-0300 polyol. Increases in hardness are achieved by modification with either TMP or THEIC with THEIC being somewhat better. The use of Niax PCP-0310, a higher molecular weight polycaprolactone triol results in a much softer and more flexible coating. After the introduction of either TMP or THEIC, the coatings still exhibit flexibility. Acid resistance of the THEIC based products are superior to those alone or modified with TMP. THEIC is also shown to impart excellent weather resistance.

TABLE 3

PROPERTIES OF OXAZOLIDINE-BASED COATINGS

| Properties | 0300/— | 0300/TMP | 0300/THEIC | 0310/— | 0310/TMP | 0310/THEIC | 0301/— | 0301/TMP |
|---|---|---|---|---|---|---|---|---|
| Set, Hrs | ½− | ½+ | ½− | ½+ | ½+ | ½− | | |
| Thru, Hrs | ¾+ | ¾ | ¾ | ¾ | ¾ | ¾ | | |
| Hard, Hrs | 1¼ | 3½ | 1¼ | 1¼ | 1¼ | 1¼ | | |
| Tack Free, Hrs | 1¼ | 1 | 1 | 1¼ | 1¼ | 1¼ | ¾ | 1 |

TABLE 3-continued

| Properties | 0300/— | 0300/TMP | 0300/THEIC | 0310/— | 0310/TMP | 0310/THEIC | 0301/— | 0301/TMP |
|---|---|---|---|---|---|---|---|---|
| PROPERTIES OF OXAZOLIDINE-BASED COATINGS | | | | | | | | |
| Sward Hardness | | | | | | | | |
| @ 1 Day | 18 | 22 | 34 | 6 | 24 | 30 | — | — |
| @ 7 Days | 40 | 50 | 54 | 20 | 38 | 48 | 50 | 54 |
| Tape Properties | Exc | Exc | Exc | Exc | Exc | Exc | Exc | Exc |
| Impact, D/R | 160/160 | 30/0 | 20/0 | 160/160 | 160/160 | 160/160 | 10/0 | 0/0 |
| Conical Mandrel Flexibility | Pass | Pass | Pass | Pass | Pass | Pass | Fail | Fail |
| Solvent Resistance (Xyl, IPA, Acetone) | 100+ (Hard) | 100+ (Hard) | 100+ (Hard) | 100+ (Hard) | 100+ (Hard) | 100+ (Hard) | | |
| Acid Resistance | Poor | Poor | Good | Poor | Poor | Good | | |
| Alkali Resistance | Exc | Exc | Exc | Exc | Exc | Exc | | |
| Stain Resistance | Exc | Exc | Exc | Fair | Exc | Exc | | |
| *QUV Weatherometer Resistance | | | | | | | | |
| Gloss, Initial | | | 100+ | | | 100+ | | |
| 1500 Hrs | | | 100+ | | | 100+ | | |
| 1700 Hrs | | | 90/60 | | | 95/70 | | |
| 2300 | | | 70/37 | | | 83/41 | | |

*Q Panel Co. weathering tester. Samples were exposed to cycles of 4 hours of water (condensation) followed by 8 hours on UV at 50° C. Gloss was measured by light reflectance at 60° and 20° angles of incidence.

What is claimed is:

1. A storage stable, weather resistant, one-component air cured urethane composition which comprises a moisture activated curing agent and a polyisocyanate prepolymer, said moisture activated curing agent comprising an oxazolidine ring and said polyisocyanate prepolymer comprising at least two unreacted isocyanate groups and being the reaction product of a polyester polyol, a low molecular weight polyol having at least three hydroxy groups at an equivalent weight ratio of polyester polyol to low molecular weight polyol of from 0.25:1 to 5:1 and isophorone diisocyanate.

2. The urethane composition of claim 1 wherein the equivalent weight ratio of isophorone diisocyanate to combined polyester polyol and low molecular weight polyol is from 1.4:1 to 2.5:1.

3. The urethane composition of claim 2 wherein the low molecular weight polyol is a triol having a molecular weight below 400, the curing agent is present in an equivalent weight ratio to prepolymer of from 0.4:1 to 2:1 and the equivalent weight ratio of the polyester polyol to the triol is from 0.5:1 to 3:1.

4. The urethane composition of claim 3 wherein the triol is selected from the group consisting of: glycerine, trimethylol propane, trimethylolethane, hexanetriol and tris(2-hydroxyethyl) isocyanurate.

5. The composition of claim 4 wherein the triol is tris(2-hydroxyethyl) isocyanurate.

6. The urethane composition of claim 2 wherein the curing agent is an acrylic containing oxazolidine having the formula:

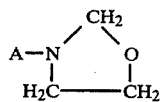

wherein A is an acrylic moiety.

7. The urethane composition of claim 4 wherein the curing agent is an acrylic containing oxazolidine having the formula:

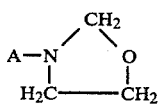

wherein A is an acrylic moiety.

8. A method for coating a surface which comprises applying the composition of claim 1 to the surface and exposing the applied composition to air having a relative humidity of at least 10%.

9. A method for coating a surface which comprises applying the composition of claim 2 to the surface and exposing the applied composition to air having a relative humidity of at least 10%.

10. A method for coating a surface which comprises applying the composition of claim 4 to the surface and exposing the applied composition to air having a relative humidity of at least 10%.

11. A method for coating a surface which comprises applying the composition of claim 5 to the surface and exposing the applied composition to air having a relative humidity of at least 10%.

12. A method for coating a surface which comprises applying the composition of claim 6 to the surface and exposing the applied composition to air having a relative humidity of at least 10%.

13. An article coated with the cured composition of claim 1.

14. An article coated with the cured composition of claim 2.

15. An article coated with the cured composition of claim 3.

16. An article coated with the cured composition of claim 4.

17. An article coated with the cured composition of claim 5.

18. An article coated with the cured composition of claim 6.

19. An article coated with the cured composition of claim 7.

20. A polyurethane composition which comprises a moisture cured film of the composition of claim 1.

21. A polyurethane composition which comprises a moisture cured film of the composition of claim 2.

22. A polyurethane composition which comprises a moisture cured film of the composition of claim 3.

23. A polyurethane composition which comprises a moisture cured film of the composition of claim 4.

24. A polyurethane composition which comprises a moisture cured film of the composition of claim 5.

25. A polyurethane composition which comprises a moisture cured film of the composition of claim 6.

26. A polyurethane composition which comprises a moisture cured film of the composition of claim 7.

* * * * *